May 24, 1927. 1,630,083
B. C. HINCKLEY ET AL
REAMING MECHANISM
Filed Feb. 2, 1925
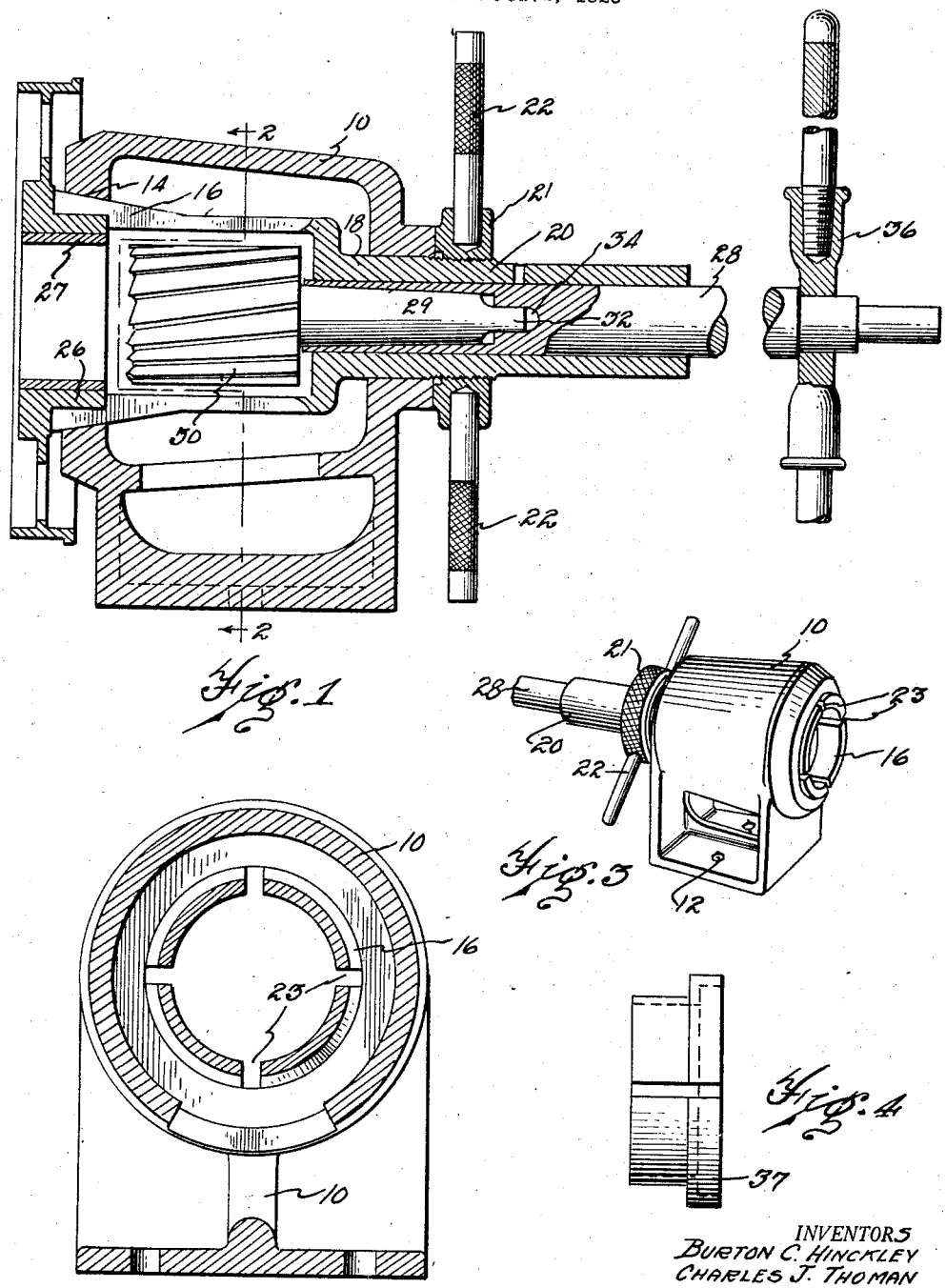
INVENTORS
BURTON C. HINCKLEY
CHARLES J. THOMAN
BY GEORGE E. HOLTON
Parker and Burton
ATTORNEY.

Patented May 24, 1927.

1,630,083

UNITED STATES PATENT OFFICE.

BURTON C. HINCKLEY, CHARLES J. THOMAN, AND GEORGE E. HOLTON, OF JACKSON, MICHIGAN, ASSIGNORS TO THE HINCKLEY-MYERS COMPANY, OF JACKSON, MICHIGAN, A CORPORATION OF MICHIGAN.

REAMING MECHANISM.

Application filed February 2, 1925. Serial No. 6,234.

Our invention relates to an improved reaming device and is adapted to releasably hold a cylindrical object and accurately ream the same.

An object is to provide such a device adapted to support a piece of work to be reamed in such a manner that the reamer is disposed at all times co-axially the supported work and is particularly adapted for the reaming of Ford transmission drum bushings.

An object of importance is the provision in a device of the character described of a work holder having a reamer arranged co-axially thereto to be advanced therethrough and ream the work held thereby. A meritorious feature is the employment in such machine of a work holder having a head adapted to receive and releasably support the work and a reamer mounted concentrically thereto adapted to be advanced therethrough to ream the work, the head being contractible to grip the work to support the same at all times co-axially of the reamer.

Our work holder is adapted to receive and support gears or other circular parts of different diameters, centering the same relative to the reamer and the reamer is so mounted with respect to the work holder as to be substantially incapable of relative displacement, whereby the reamer is maintained in accurate alinement with the work holder at all times.

In reaming the bushings employed in Ford transmission drums and other similar articles, the gear which carries the bushing to be reamed is frequently located eccentrically to the outside diameter of the drum in which case it is not possible to accurately ream the bushing if the work is supported from such outside diameter of the drum. We therefore provide means for engaging the gear for support which centers the gear relative to the reamer, the reamer having a bearing co-axially within the support for advancement therethrough so that the relative alinement between the reamer and the support is always maintained.

Other objects and meritorious advantages, together with the details of construction, will more fully appear from the following description of the embodiment of our invention illustrated in the accompanying drawing and defined in the appended claims.

In the drawings:

Fig. 1 is a vertical sectional view through our improved reamer.

Fig. 2 is a sectional view taken on line 2—2 of Fig. 1.

Fig. 3 is a perspective of our improved reamer.

Fig. 4 is an elevation of an adapter capable of use in connection with our reamer.

We provide a frame or body portion for the reamer indicated as 10, which is adapted to be secured and fastened to a work bench by means of screws or bolts extending through the openings 12 in the base of the frame. This frame is hollow and is provided with a tapered opening 14, tapered to serve as a bearing for the tapered head 16 of a collet 18. The collet 18 is provided with a hollow shank 20 which has a bearing as shown in Fig. 2 in the frame of the reamer. The outer surface of the collet shank is threaded in proximity to the reamer frame and carries an adjusting nut 21 provided with suitable handles 22 whereby the collet may be withdrawn relative to the frame to bring the tapered head into close engagement with the tapered bearing opening in the frame within which the head is disposed. It will be noted that the head of the collet is slotted longitudinally at a plurality of points 23 so as to permit the head to be contracted to grip a cylindrical piece of work such as a gear 26, which may be disposed within the mouth of the head.

Mounted within the hollow shank 20 of the collet, is a reamer pilot 28. This pilot is provided at one end with the conventional tapered recess to removably receive the shank 29 of a reamer 30. The reamer 30 is held to rotate with the pilot by means of a tang 32 which extends into a seat 34 in the bottom of the recess of the pilot. The opposite end of the pilot carries a wrench 36 whereby the pilot may be rotated to advance the reamer through the work supported by the head of the collet. The pilot and reamer as a unit is mounted co-axially of the work supporting head of the collet, and is maintained at all times concentric thereto.

In operation, a gear 26 carrying a bushing 27 is inserted in the advanced head of the collet and by means of the nut 21 the collet 20 is withdrawn so that the taper of the head engages the tapered bearing within which the head is mounted and the head is contracted to grip the gear to hold it firmly in place, and the reamer is advanced through rotation of the pilot member and forced through the bushing reaming the same accurately concentric the gear.

Through the use of the adapter 37 shown in Fig. 4, it is possible to accommodate a different type of gear such as a double or triple gear, as the adapter itself is receivable within the head of the collet and is in the form of a divided ring contractible upon the exertion of pressure thereon.

Due to the reamer having a bearing support located co-axially of the work support of the collet, the reamer is at all times maintained at the proper position to accurately ream a cylindrical object carried in the work support of the collet. It is not possible for the reamer to be displaced or get out of alinement with the axis of the work support.

What we claim is:

1. In a reaming fixture, a frame having a pair of spaced-apart concentric bearings, one of said bearings being tapered, a collet movably supported within said bearings, said collet having a contractible head mounted within the tapered bearing, and a hollow shank arranged axially of the head mounted within the other bearing of the frame, a reaming tool having a cutter head disposed within the head of the collet between said bearings, and a shank extending through the hollow shank of the collet and having a bearing therein to support the cutter head coaxially within the head of the collet, means engaging the shank of the collet for withdrawal of the same through the tapered bearing in the frame to contract the collet head, and means for advancing the reaming tool longitudinally through the collet.

2. In a reaming device, a frame having a base provided with a pair of upright standards and a hollow casing supported thereby, a collet mounted within said casing having a tapered split head mounted within a tapered bearing in one wall of the casing and a shank mounted in a concentric bearing in the opposite wall of the casing, a reaming tool having a cutting head mounted within the work holding head of the collet and a shank extending through and having a bearing in the collet shank, a handle rotatably threaded on the collet shank to move the same longitudinally relative to the casing, and means engaging the shank of the reaming tool to advance the same through the work holding head of the collet and the work carried thereby.

3. In a reaming fixture, a frame having a base, a housing upon the base, said housing provided with spaced-apart concentric bearings, one of said bearings being tapered, a collet movably supported within said bearings, said collet having a hollow longitudinally split work supporting head mounted within the tapered bearing of the housing and a hollow shank arranged coaxially to the said head mounted within the other bearing of the housing, an adjusting nut threaded on the shank of the collet to withdraw the collet relative to the housing to contract the head of the collet within the tapered bearing of the housing, a reaming tool having a shank mounted within the hollow shank of the collet, and a cutter head disposed wholly within the hollow head of the collet, and means for advancing the reaming tool longitudinally through said collet to advance the cutter head outwardly beyond the head of the collet.

4. In a reaming fixture, a base, a housing on the base, said housing having a pair of opposite side walls provided with a pair of concentric bearings, one in each side wall, one of said bearings being tapered, a collet mounted within said bearings for endwise movement, said collet having a hollow contractible work supporting head mounted within the tapered bearing of the housing and adapted to be contracted thereby upon withdrawal of the head through said bearing and a hollow shank mounted in the other bearing of the housing, a reaming tool supported within the hollow shank of the collet for endwise movement therethrough provided with a cutter head disposed coaxially within the hollow head of the collet and within said housing and means for advancing said cutter head outwardly beyond the head of the collet and through the tapered bearing in the housing.

In witness whereof we sign this specification.

BURTON C. HINCKLEY.
CHARLES J. THOMAN.
GEORGE E. HOLTON.